UNITED STATES PATENT OFFICE.

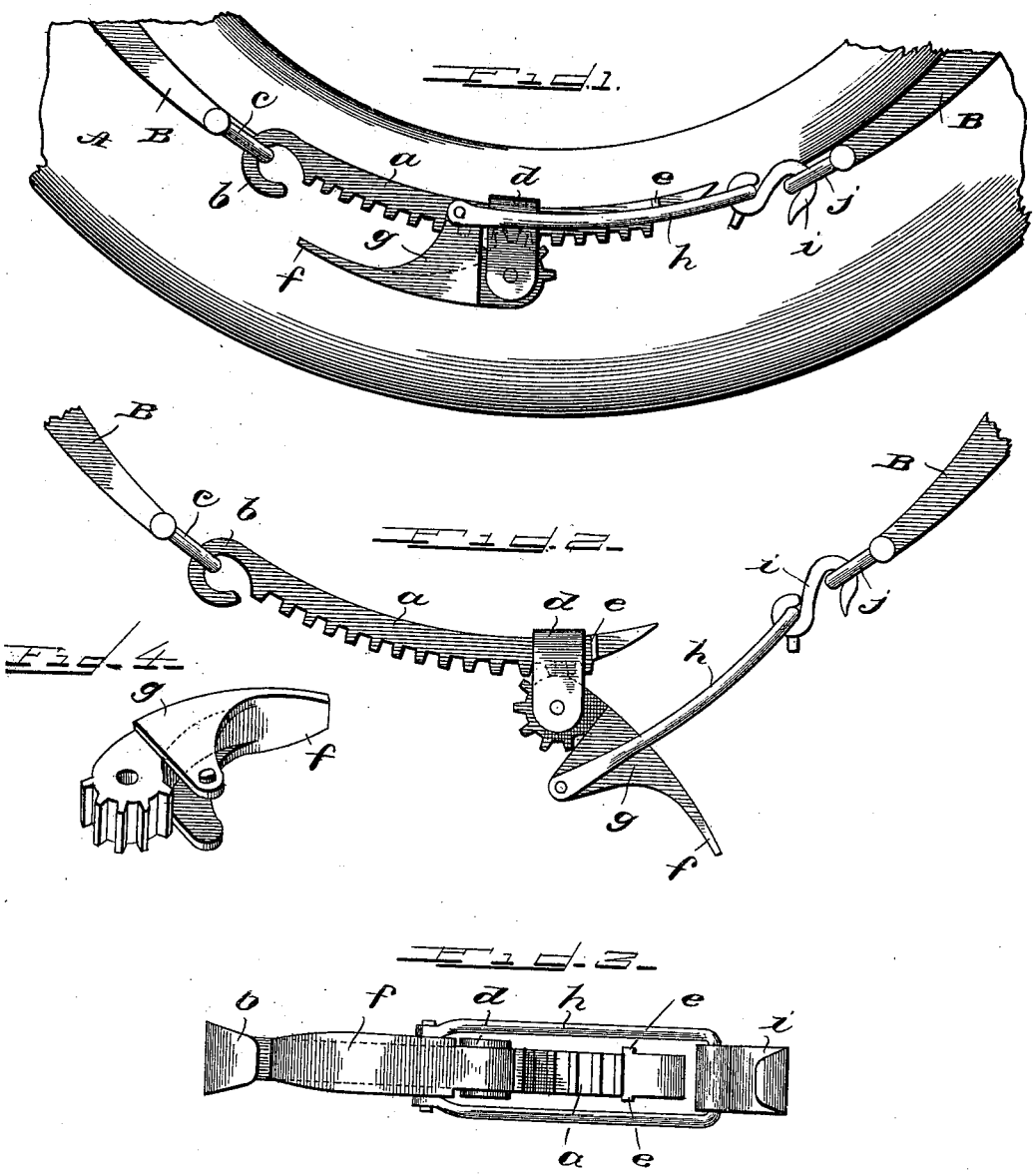

FRANK GAHM, OF RANSOM, ILLINOIS.

HAME-FASTENER.

SPECIFICATION forming part of Letters Patent No. 665,425, dated January 8, 1901.

Application filed January 15, 1900. Serial No. 1,531. (No model.)

*To all whom it may concern:*

Be it known that I, FRANK GAHM, a citizen of the United States, residing at Ransom, in the county of La Salle and State of Illinois, have invented certain new and useful Improvements in Hame-Fasteners, of which the following is a specification, reference being had to the accompanying drawings.

My invention relates to improvements in fasteners for hames, and has for its object to provide a fastener that can be readily and quickly adjusted, so as to permit the hames to fit properly in place when changed from one horse to another, and at the same time to provide a device that is cheap to manufacture, simple in construction, strong, and one that affords a secure locking of the hames in place. I accomplish this object by the construction and arrangement of parts shown in the accompanying drawings and as hereinafter specifically described.

That which I claim as new will be set forth in the claims.

In the drawings, Figure 1 is a side elevation of my improved fastener in a locked position, a portion of a horse-collar and the lower ends of the hames to which my improved fastener is applied being also shown. Fig. 2 is a similar view showing the fastener unlocked and in position to be adjusted as desired, showing also a portion of the hames. Fig. 3 is a bottom view of the fastener in a locked position; and Fig. 4 is a detail, being a perspective view of the toothed locking-lever.

Referring to said drawings, A indicates a horse-collar of usual construction, and B B the hames thereon.

$a$ indicates a bar curved as shown to substantially conform to the curvature of the lower portion of the collar A and having on its under face a series of teeth, as shown. At one end it is provided with a hook $b$, adapted to engage a hook or eye $c$ on the lower end of one of the hames B. Other equivalent means may of course be employed for detachably securing it to the hames.

$d$ indicates a clip embracing the toothed bar $a$ and free to move thereon when the parts are in the position indicated in Fig. 2. It is prevented from being moved off of the bar at the ends thereof by a stop $e$ near one end and by the enlarged hook portion $b$ at the other end.

$f$ indicates a lever, enlarged at one end in the form of construction shown and pivoted at such enlarged end between the depending sides of the clip $d$. As shown, such end of the lever is rounded and is provided with a number of teeth adapted to mesh with the toothed edge of the bar $a$, such teeth being so arranged, however, that upon the lever being thrown back, as in Fig. 2, they will be entirely disengaged from the teeth on the bar $a$, so that the lever and its attached parts may be adjusted as desired. The lever has formed with it or suitably secured to it side pieces $g$, to which, at a suitable point, are pivoted the ends of a bail $h$, which bail carries in the construction shown a suitable hook $i$, adapted to be engaged with a hook or eye $j$ on the lower end of one of the hames B. The bail may of course be otherwise suitably connected to the hame.

To fasten the hame ends together by my improved fastener, the lever $f$ is turned down, as in Fig. 2, so that its teeth are disengaged from the teeth of the bar, the device as a whole being then attached by its hooks $b$ and $i$ to the lower ends of the hames. Pressure is then applied to force the clip $d$ along the bar $a$, and when approximately the right adjustment is attained the lever is forced up, causing its teeth to engage the teeth of the bar, and thereby of course drawing the ends of the hames still closer together. When the lever has been pushed into place, the pivotal points of attachment of the bail $h$ will have passed the pivot of the lever to the clip, thereby insuring a firm locking of the parts together and one not liable to become accidentally broken. As shown, the lever $f$ is of such width that its side pieces $g$ will embrace the bar $a$ when the device is in locking position.

The device is cheap, strong, easily operated, and one that enables the hames to be secured firmly in position at any time in case they are shifted from one horse to another.

That which I claim as my invention, and desire to secure by Letters Patent, is—

1. In a hame-fastener, the combination with a toothed bar, and means for attaching it to a hame, of a lever slidingly connected with said bar and having a toothed edge adapted to engage the teeth of the bar when in one position but which is free to slide on the bar when in another position, and means connected at one end to the lever at a point intermediate the ends thereof and at its other end to the opposite hame, substantially as and for the purpose specified.

2. In a hame-fastener, the combination with a toothed bar, and means for attaching it to a hame, of a clip embracing said bar and adapted to slide thereon, a lever pivoted between the ends of said clip and having a toothed edge adapted to engage the teeth of the bar when in one position but which is free to slide on the bar when in another position, and means connected at one end to the lever at a point intermediate the ends thereof and at its other end to the opposite hame, substially as and for the purpose specified.

3. In a hame-fastener, the combination with a toothed bar, and means for attaching it to a hame, of a clip embracing said bar and adapted to slide thereon, a lever pivoted between the ends of said clip and having a toothed edge adapted to engage the teeth of the bar when in one position but which is free to slide on the bar when in another position, a bail secured to opposite sides of the lever at a point intermediate the ends thereof, and means for connecting said bail to the opposite hame, substantially as and for the purpose specified.

4. In a hame-fastener, the combination with a toothed bar, and means for attaching it to a hame, of a lever slidingly connected with said bar and having at one end a series of teeth arranged in the arc of a circle, said teeth being adapted to successively engage the teeth on the bar when the lever is moved in one direction to cause a relative movement between said toothed parts, but which toothed parts will be out of mesh when the lever is moved to a position in the opposite direction, whereby said lever will be free to be moved back and forth on the bar, and means pivotally connected at one end to the lever at a point intermediate the ends thereof and at its other end to the opposite hame.

5. In a hame-fastener, the combination with a toothed bar and means for attaching it to a hame, of a clip embracing said bar and adapted to slide thereon, a lever pivoted between the ends of said clip and having at one end a series of teeth arranged in the arc of a circle, said teeth being adapted to successively engage the teeth on the bar when the lever is moved in one direction, to cause a relative movement between said toothed parts, but which toothed parts will be out of mesh when the lever is moved to a position in the opposite direction, whereby said lever will be free to be moved back and forth on the bar, and means pivotally connected at one end to the lever at a point intermediate the ends thereof and at its other end to the opposite hame.

6. In a hame-fastener, the combination with a toothed bar and means for attaching it to a hame, of a clip embracing said bar and adapted to slide thereon, a lever pivoted between the ends of said clip and having at one end a series of teeth arranged in the arc of a circle, said teeth being adapted to successively engage the teeth on the bar when the lever is moved in one direction, to cause a relative movement between said toothed parts, but which toothed parts will be out of mesh when the lever is moved to a position in the opposite direction, whereby said lever will be free to be moved back and forth on the bar, a bail pivoted to opposite sides of the lever at a point intermediate the ends thereof, and means for connecting said bail to the opposite hame.

7. In a hame-fastener, the combination with a toothed bar, and means for attaching it to a hame, of a lever slidingly connected with said bar and having at one end a series of teeth arranged in the arc of a circle, said teeth being adapted to successively engage the teeth on the bar when the lever is moved in one direction to cause a relative movement between said toothed parts and to lock them against movement when the lever has reached its limit of movement, but which toothed parts will be out of mesh when the lever is moved to a position in the opposite direction whereby the same will be free to be moved back and forth on the bar, a bail pivotally connected at one end to the lever, said pivotal connection being past the dead-center when the lever is in its locked position, and means for connecting said bail to the opposite hame.

FRANK GAHM.

Witnesses:
J. R. WORMLEY,
GEORGE BRADY.